United States Patent [19]

Sarumaru

[11] Patent Number: 4,582,470
[45] Date of Patent: Apr. 15, 1986

[54] APPARATUS FOR VULCANIZING A TIRE

[76] Inventor: Kazumasa Sarumaru, 8-27 Kinmitsu-cho, Ashiya, Japan

[21] Appl. No.: 355,778

[22] Filed: Mar. 8, 1982

[30] Foreign Application Priority Data

Mar. 26, 1981 [JP] Japan .................................. 56-44984
Nov. 20, 1981 [JP] Japan ................................ 56-187440

[51] Int. Cl.$^4$ ............................................. B29H 5/02
[52] U.S. Cl. ...................................... 425/36; 264/501; 425/32; 425/44; 425/58
[58] Field of Search ....................... 425/32, 36, 44, 58, 425/DIG. 5; 264/501

[56] References Cited

U.S. PATENT DOCUMENTS

| | | |
|---|---|---|
| 2,571,258 | 10/1951 | Kolins . |
| 2,901,771 | 9/1959 | Frohlich et al. . |
| 2,904,832 | 9/1959 | Frohlich et al. .................. 425/36 X |
| 2,939,175 | 6/1960 | Frohlich et al. .................. 425/36 X |
| 2,997,740 | 8/1961 | Soderquist ............................. 425/32 |
| 3,113,344 | 12/1963 | Frohlich et al. . |
| 3,659,975 | 5/1972 | Leblond ............................ 425/44 X |

FOREIGN PATENT DOCUMENTS

| | | |
|---|---|---|
| 617596 | 4/1961 | Canada . |
| 626800 | 9/1961 | Canada . |
| 681698 | 3/1964 | Canada . |
| 949712 | 6/1974 | Canada . |
| 2161939 | 6/1973 | Fed. Rep. of Germany . |
| 1173013 | 2/1959 | France . |
| 2142032 | 1/1973 | France . |
| 2171285 | 9/1973 | France . |
| 53-138482 | 12/1978 | Japan ..................................... 425/36 |
| 57-93131 | 6/1982 | Japan . |
| 361395 | 5/1962 | Switzerland . |

Primary Examiner—Jan Silbaugh
Attorney, Agent, or Firm—Marshall, O'Toole, Gerstein, Murray & Bicknell

[57] ABSTRACT

An apparatus and method for vulcanizing a tire using a pair of split dies which form a tire receiving space between them when the dies are closed. The dies include sealing surfaces within the space and adjacent the axially outer surfaces of the tire beads. The apparatus is mounted within the space and within the inner diameter of the tire, and includes holding means which are radially movable into and out of engagement with the tire beads. The apparatus further includes extruding means which operate in association with the movement of the dies when opening and closing, for moving the holding means toward and away from the tire beads. When the dies are closed, the extruding means move the holding means to press the beads tightly against the sealing surfaces. The interior of the tire is then directly heated and pressurized.

16 Claims, 22 Drawing Figures

APPARATUS FOR VULCANIZING A TIRE

DETAILED DESCRIPTION

This invention relates to apparatus and method for vulcanizing a tire by placing an unvulcanized tire within a pair of split dies, closing the dies to form a closed space, the tire being within the space, and allowing a medium of heat and pressure to act directly on the interior of the tire within the space.

A conventional method of vulcanizing a tire comprises placing a green tire within a space formed between a pair of upper and lower split dies, or placing in the dies a tire including a vulcanized tire casing and an unvulcanized tread or camel back provisionally bonded to the outer periphery of the casing. A rubber bag or bladder is provided within the tire and it is inflated to securely press the tire against the heated inner surfaces of the dies for the predetermined time needed for vulcanization. Hot water, vapor or the like may be supplied into the interior of the bladder in order to inflate it and provide additional heat from the inside of the tire. The presence of the bladder, however, lowers the efficiency of heat transfer from the high-pressure fluid to the tire. Also, the bladder deteriorates in a short time, requiring replacement after a limited time of use.

Recently, a method of vulcanization has been proposed wherein the bladder is eliminated, as shown for example in the inventor's U.S. Pat. No. 3,903,227. This method comprises placing a tire within a pair of split dies, closing the dies to form a closed space which includes the inside of the tire, the space being provided with a heat source therewithin, supplying a medium of pressure directly into the space, and directly applying pressure and heat on the inside of the tire, thereby increasing the efficiency of heat transfer and avoiding the need for a bladder.

This method requires that the tire completely closely fits inside the dies and seals the joints when the dies are closed, to keep the pressure medium from leaking out through the junctures or joints between the parts that form the dies. To achieve this, an appartus is required to mechanically press the tire beads outwardly against the inner surfaces of the dies in order to seal this connection.

It is desirable that bead-pressing apparatus, when the dies are open, be located so as not to impede the insertion of the tire into or the removal of the tire from the dies. The bead pressing apparatus should therefore have a radius shorter than the beads, and when the dies are closed, extend to the radius of the beads to apply the proper outward compression at a predetermined pressure.

It is therefore a general object of the present invention to provide a method and an apparatus, in a machine for vulcanizing a tire by causing a pressure medium to act directly within the tire, for properly pressing the tire beads against inner surfaces of the dies upon vulcanization, the pressing apparatus working in association with the closing and opening of the dies, without disturbing the insertion of the tire into and removal of it from the dies.

According to this invention, in a machine for vulcanizing a tire by exposing it directly to high-temperature and high-pressure fluid within a circular closed space formed between a pair of upper and lower split dies axially movable relative to each other and adapted to sandwich the tire therebetween, an apparatus is provided for forcing the tire beads outwardly to closely fit against dies surfaces inside the dies in order to seal said space, said apparatus comprising supporting means provided between said dies, holding means at least normally supported by said supporting means, said holding means being biased radially inwardly to a normal position to retract away from the tire beads when said dies are open, and extruding means provided between said dies and axially movable relative to said supporting and holding means and working in association with the movements of said dies for slidable compressive engagement with said holding means, whereby, when said dies are open, said holding means is radially inwardly retracted away from the tire beads and, when said dies close, said holding means is radially outwardly forced toward the tire beads to hold the beads in sealing engagement with the inner sides of the dies.

Preferred embodiments of this invention will be explained hereinafter with reference to the accompanying drawings, wherein.

Figure 1:
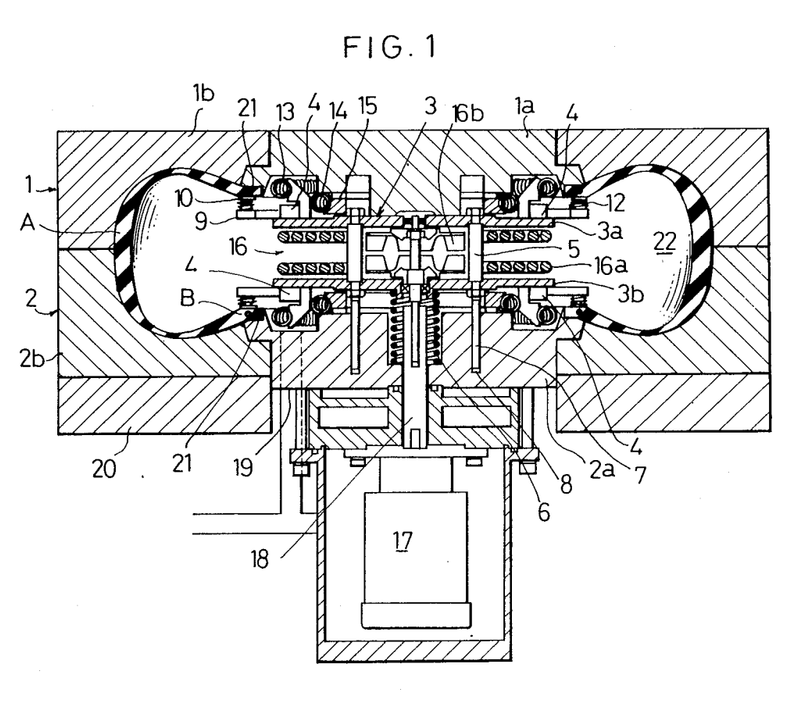
FIG. 1 is a side view in axial section of apparatus in accordance with a first embodiment of the invention, showing the apparatus in the closed position.
Figure 2:
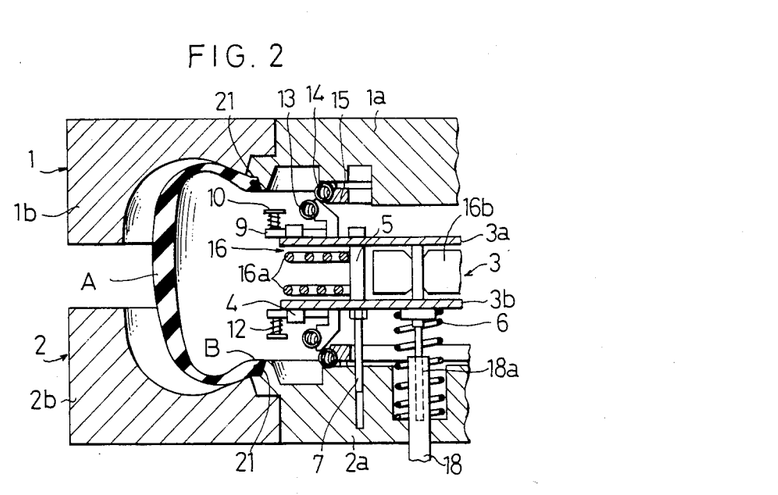
FIG. 2 is a fragmentary side view in axial section showing the apparatus in a different position.
Figure 3:
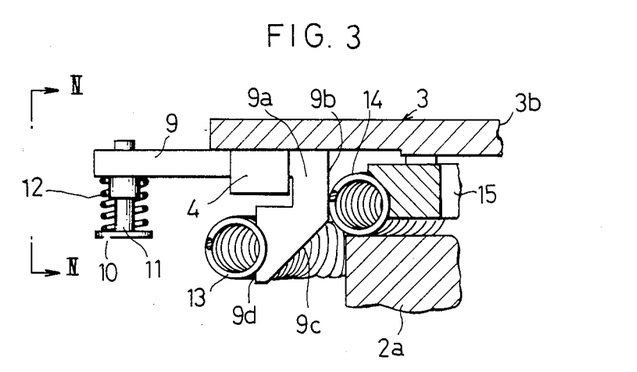
FIG. 3 is an enlarged fragmentary view of a part of the apparatus shown in FIG. 1.
Figure 4:
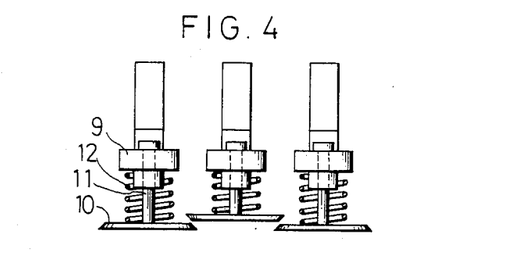
FIG. 4 is an end view taken on the line 4—4 of FIG. 3.

With reference first to the embodiment shown in FIGS. 1-4, the apparatus comprises a pair of generally circular, upper and lower split dies 1 and 2, the dies respectively including central parts 1a and 2a and annular tread parts 1b, 2b which surround the central parts. The lower die 2 is fixed to a support 20 and the upper die 1 is axially movable relative to the lower die by conventional means (not shown). The die parts form a cavity or space thereinside to encase or fit around a tire A when they are closed (FIG. 1). The tire A may be a conventional type including beads B, a tread part and side wall.

Supported by the central part 2a of lower die 2, between the central parts 2a and 1a, is a circular holder 3 including a pair of upper and lower discs 3a and 3b spaced from each other and secured together by fasteners 5. Interposed between the lower holder disc 3b and the lower die 2 is a compression spring 6 which resiliently suspends the holder 3 above the lower die 2 when there is no downward pressure applied to it. Downwardly extending from the lower holder disc 3b are legs 7, which are slidable within axial holes 8 formed in the central part 2a of lower die 2, so that the holder 3 is able to axially reciprocate but does not rotate relative to the lower die.

Each holder disc 3a and 3b has a number of brackets 4 (see FIG. 3) secured at angular intervals on the axially outer side near its outer periphery. Each bracket 4 supports a slide 9 that is radially reciprocatable within a hole formed in the bracket, on the outer side of the associated disc.

Each slide 9 has an axial hole formed therein and a pin 11 is reciprocatably supported in the hole adjacent its radially outer end. Each pin 11 has a head plate 10 secured to its axially outer end which engages the inner side of the bead B of the tire A as shown in FIG. 1. A compression spring 12 is interposed between the plate 10 and the slide 9 and biases the plate 10 axially outwardly in order to tightly press the bead against the center parts 1a and 2a. The center parts have grooves 21 formed adjacent their outer peripheries which receive the tire beads, and the pressure of the plates 10 forms a sealed connection between the beads and the center parts.

The number of the slides 9 and the shape and size of head plates 10 are determined so that, when the slides 9 are in the radially farthest outwardly projecting positions, the spaces between the adjacent plates 10 are as small as possible. Accordingly, to prevent the adjacent plates 10 from interfering with each other when the slides 9 are drawn inwardly, the lengths of the pins 11 alternately differ slightly (see FIG. 4) in order to normally offset the plates 10 alternately at different levels.

Each slide 9 is formed with a generally axially outward extension 9a (FIG. 3) at its radially inner end. The extension 9a has a radially inner side including an axial or cylindrical side 9b which is perpendicular to and adjacent the holder 3, and an inclined or conical side 9c which extends axially and radially outwardly from the axial side 9b. The extension 9a also has a radially outer side 9d. An endless coiled tension spring 13 is supported on the outer sides 9d of slides 9 on each holder disc 3a to urge the slides 9 toward their inwardly retracted position. Grooves may be formed in the outer sides 9d to receive the spring 13.

The central parts 1a and 2a of the dies are provided with annular retainers 15 which project axially inwardly from their inner sides. The retainer 15 of each central die part 1a, 2a retains an endless coil spring 14 therearound between the die part and the retainer, for sliding engagement with the angular sides 9c of the slides 9, in order to extrude the slides 9 radially outwardly against the force of spring 13 as the dies close and the discs 3a and 3b are moved toward the central parts.

Each coil 14 may instead be replaced by a number of annularly arranged rings or rollers slidable on the angular sides 9c with low friction to move the slides 9 radially outwardly all together under the same condition.

Provided in the die cavity between the dies 1 and 2 is heating means 16 including heater coils 16a connected to an external electric power source (not shown) and a fan 16b which is coupled to a motor 17 that is mounted under the lower die 2. A shaft 18 couples the motor 17 to the fan 16b through a spline joint 18a.

In operation, the dies 1 and 2 are moved apart and a green tire A is placed between the dies 1 and 2 with the beads B in the grooves 21. When the upper die 1 is lifted from the lower die 2, the holder 3 is positioned in the upper position from the lower die 2 by the spring 6. The slides 9 are all retracted by the springs 13 and are at the normal position where they are inward of the inner diameter of the tire beads B.

The upper die 1 is then lowered (see FIG. 2), causing the coils 14 to compressively engage the slopes 9c of slides 9. This compression moves the holder 3 downwardly against the force of the spring 6, and at the same time the coils 14 slide on the slopes 9c, forwardly or radially outwardly moving the slides 9 due to the radial component of the compressive force, against the force of the springs 13.

When the coils 14 have moved on the slopes 9c to the vertical sides 9b (FIGS. 1 and 3), the slides 9 stop moving outwardly. The upper die 1 is further lowered so that the plates 10 compressively engage the inner surfaces of the tire beads B and the springs 12 compress, until the dies 1 and 2 close (see FIG. 1). Thus, a sealed space 22 including the interior of the tire, is formed between the dies 1 and 2 because the beads B sealingly engage the grooves 21.

A medium of pressure is supplied into the space 22 through an inlet 19 (FIG. 1) which is connected to pressure medium supply, and appropriate heating of the tire is made by the heating means 16 to thereby effect vulcanization of the tire. The force of the sealing medium also presses the beads B against the grooves 21 in order to reinforce the seal. When the vulcanization process is completed, the pressure medium is released and the upper die 1 is lifted in the order reverse to the above described operation, with the plates 10 releasing the beads B from their compression and moving radially away from the tire, so that the vulcanized and formed tire may be removed without difficulty.

Figure 5:
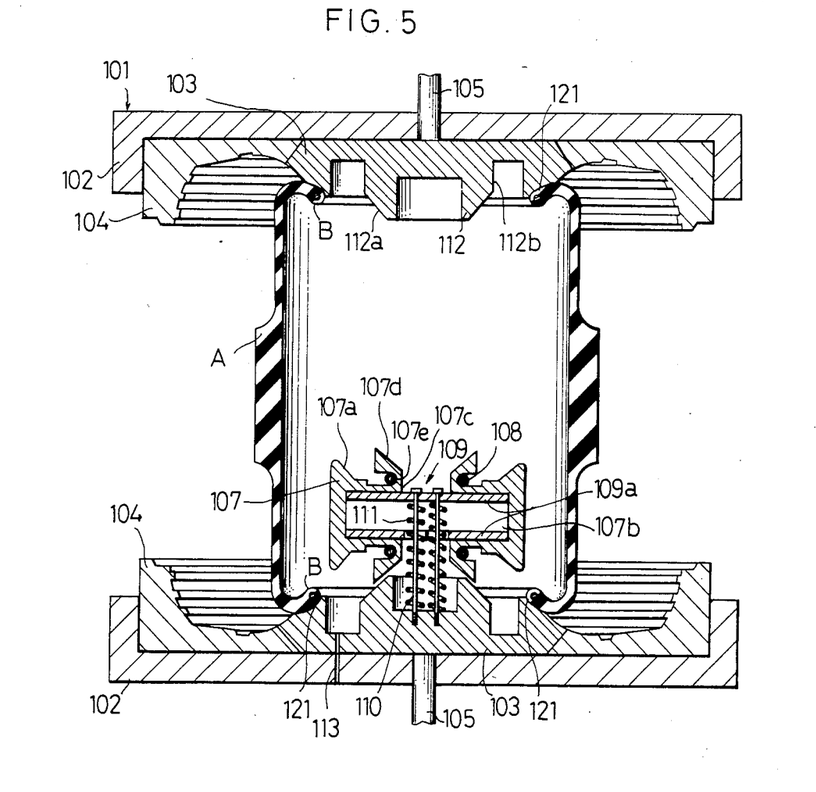
FIG. 5 is a side view in axial section showing apparatus in accordance with a second embodiment of the invention, the apparatus being shown in an open position.
Figure 6:
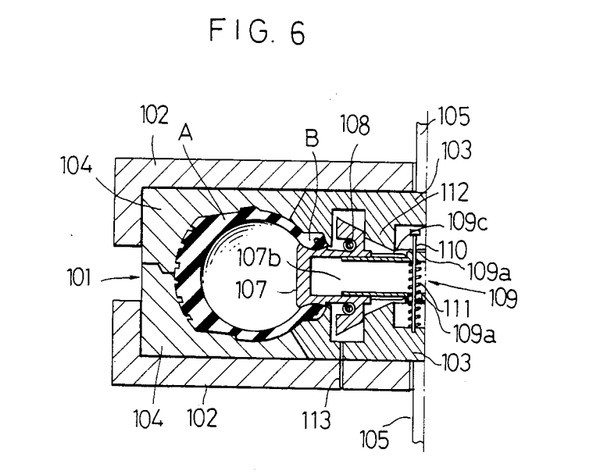
FIG. 6 is a fragmentary view in axial section showing the second embodiment in the closed position.

FIGS. 5 and 6 show the second embodiment of the invention. A pair of generally circular, upper and lower split dies 101 include upper and lower base plates 102, upper and lower bead plates or central parts 103 provided between the bases 102, and upper and lower annular tread dies 104 secured to the inner sides of bases 102 around the central parts 103. The bases 102 are axially movable relative to each other and carry the tread dies 104 with them. The central parts 103 are axially movable relative to each other and the bases 102, by means of respective rods 105.

Provided between the central die parts 103 is a circular holder 109 including a pair of upper and lower discs 109a which are spaced from each other and are fixed together by means not shown. Headed bolts 110 are secured to the lower central part 103 and extend axially toward the upper die part. The holder 109 is supported for axial movement on the bolts 110, and the bolt heads are located above the upper holder disc 109a and serve as stops for the holder. The holder 109 is urged upwardly by compression springs 111 so that the discs are normally spaced above the lower die part 103 (FIG. 5).

At least one of the holder discs 109a is formed with a number of radial grooves 109c (FIG. 6) in its outer surface.

A plurality of angularly spaced axially symmetrical slides 107 are supported on the holder 109 and are radially slidable in the grooves 109c. Each slide 107 is plate-like (on the order of the parts shown in FIGS. 7 and 8) and is thicker toward its radially outer end, with their planes axially oriented. Each slide has a pair of sides 107a adjacent its radially outer end which are shaped to sufficiently press the tire beads B against the inner peripheral sides of the central die parts 103 when the dies are closed (as shown in FIG. 6). Each slide 107 also has a pair of upper and lower wings extending across a central space 107b which opens inwardly and receives the holder discs 109a. Each of the wings has an axial side 107c at its radially inner end adjacent the bolts 110. The axial side 107c terminates at its outer end in a sloped edge 107d extending radially and axially outwardly. Each wing is formed with a recess 107e that receives a circular endless coiled tension spring 108 which urges the slides radially inwardly, so that the outer end of the slide is normally positioned slightly inwardly of the inner radius of tire A (see FIG. 5).

The inner side of each central die part 103 is formed with an axial projection or guide part 112 having a conical or bevel surface 112a formed therearound, which converges axially inwardly and is complementary to the slopes 107d of slides 107. The conical surface 112a radially outwardly terminates in an axial, cylindrical surface 112b.

The lower base 102 and the central part 103 are formed with a passage 113 therethrough for flow of a high-temperature and high-pressure fluid. The fluid flows through the spaces between the slides 107 and into the interior of the tire A and both pressurizes and heats the tire.

In operation, with the dies opened, a cylindrically formed green tire A is placed on the lower, central die part 103 with the lower tire bead B in a peripheral groove 121 formed in the inner surface of lower die part 103.

The central parts 103 are then moved toward each other so that the upper tire bead B engages a peripheral groove 121 formed in the inner surface of upper die part 103 (FIG. 5). The central die parts 103 are further moved toward each other so that the beads B move closer together and form the tire in the ordinary shape as shown in FIG. 6. This makes the conical surfaces 112a of die parts 103 compressively engage the slopes 107d of the slides and to extrude the slides 107 radially outwardly toward the tire beads.

The upper base 102 with the upper annular die part 104 are then moved relatively toward their lower counterparts to engage the central die parts 103 until the annular parts 104 engage and close the die (FIG. 6). This action forces the central die parts 103 further toward each other, forcing the slides 107 further outwardly until the axial sides 107c of the slides have reached the cylindrical surfaces 112b of the central die parts, and at this time the tire beads B are tightly pinched between the central die parts 103 and the slide sides 107a. The slides 107 move in and are guided by the grooves 109c formed in the discs 109a.

Figure 7:
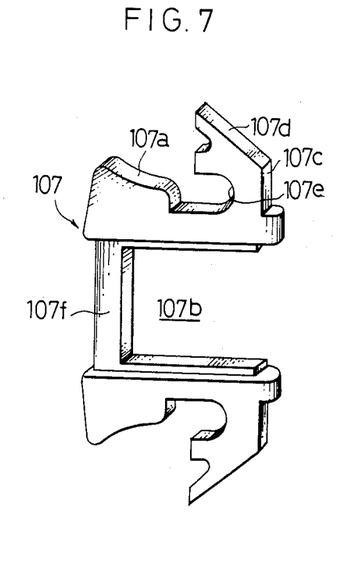
FIGS. 7-9 are perspective views of alternative forms of a part of the apparatus shown in FIGS. 5 and 6.

FIG. 7 shows a modified form of the slide 107 wherein similar reference numerals indicate the parts corresponding to the slide shown in FIGS. 5 and 6. The slide of FIG. 7 has a central portion 107f that is thinned to facilitate the flow therethrough of the high temperature-pressure fluid.

Figure 8:
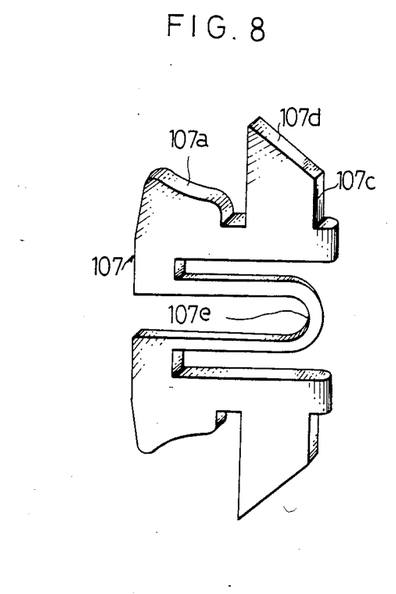

FIG. 8 shows still another form of slide 107, which has a single, central U-shaped part 107e closed at its inward end for engagement with the single tension spring 108, the U-shaped part being movable between the holder discs 109a.

Figure 9:
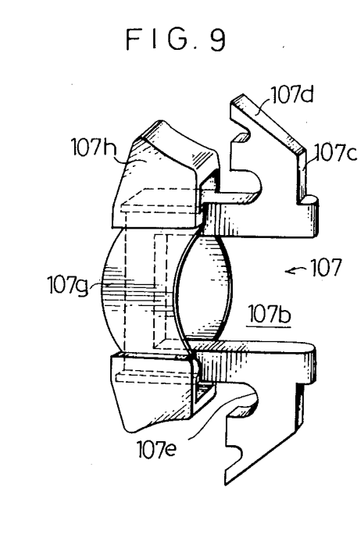

FIG. 9 shows a further form of slide 107, which has a pair of separate, upper and lower parts 107h for engaging the tire beads. The parts 107h are axially slidable relative to the slide body and are urged outwardly by a pair of flat springs 107g placed between the parts 107h. This arrangement enables the slide 107 to be used with tires of different axial dimensions between the beads.

Figure 10:
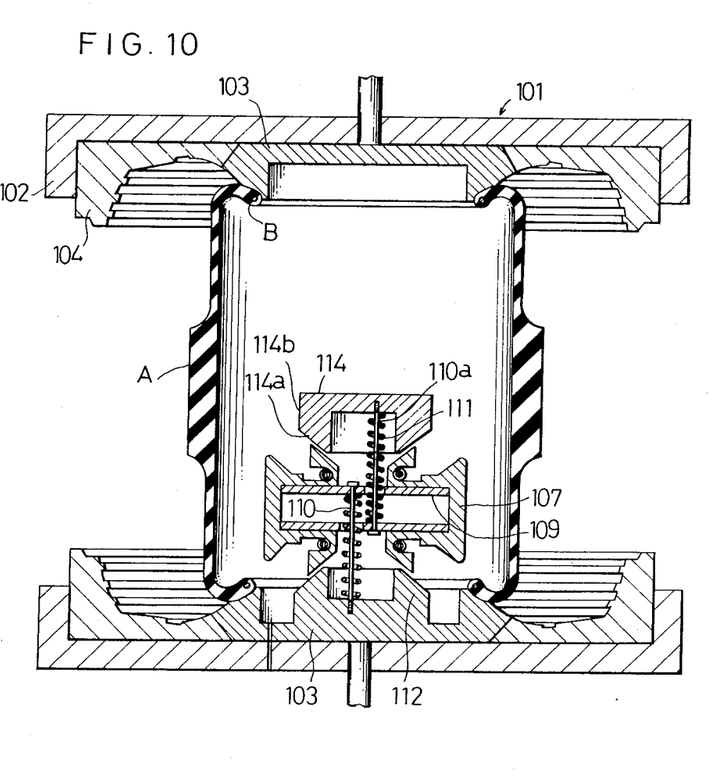
FIG. 10 is a view similar to FIG. 5 but showing a third embodiment of the invention in an open position.

FIG. 10 shows a third embodiment which is similar to the second embodiment of FIGS. 5 and 6, but has an upper guide member 114 which is separate from the upper die part 103. The member 114 is in place of the projection 112 of the second embodiment, and the member 114 has a bevel side 114a and an axial side 114b. The holder 109 is resiliently supported by at least one headed bolt 110 with springs, above the lower die part 103, similarly to the form of FIG. 5. Another set of headed bolts 110a is provided which are axially slidable through the holder discs with their stop heads located outside the lower holder disc and their other ends threaded into the upper guide member 114. The guide member 114 is urged upwardly from the discs by compression springs 111 provided between the guide member and holder discs, so that the guide member is axially resiliently supported and is normally spaced above the slides 107.

The operation of this embodiment is essentially the same as the embodiment of FIGS. 5 and 6. When the upper die part moves downwardly, it engages the guide member 114 and presses it against the slides 107.

Figure 11:
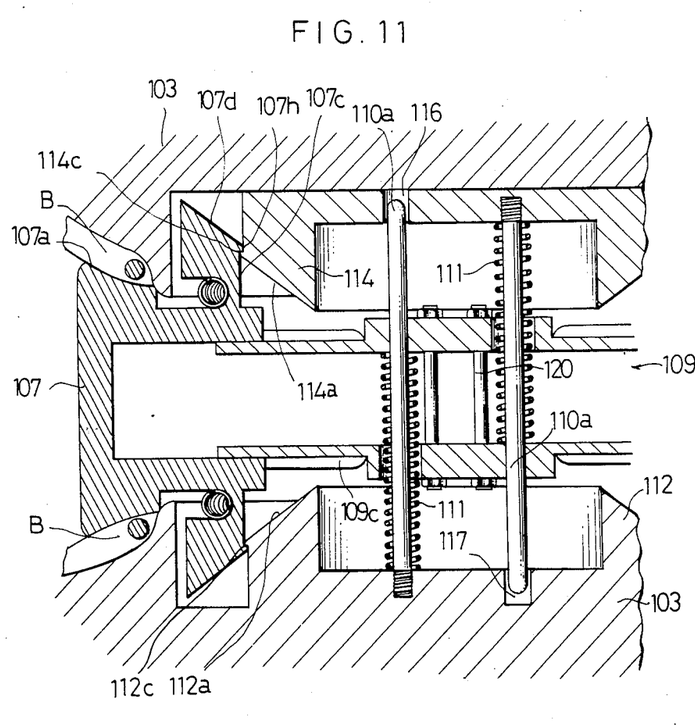
FIG. 11 is an enlarged fragmentary side view in axial section showing the fourth embodiment of the invention, in the closed position.

FIG. 11 shows the fourth embodiment which is similar to the third embodiment of FIG. 10. It includes a plurality of angularly spaced radially movable slides 107. Each wing of each slide 107 is formed with a radially inward projection 107h between its axial side 107c and its sloped side 107d, while the guide parts 112 and 114 are each formed with a radially outward projection 112c or 114c to engage the associated inward projection 107h after the slope 107d of the slide leaves the conical surface 112a or 114a of the guide parts when the dies are closed. This engagement secures the pinch of the tire beads B between the die parts 103 and slides 107.

The holder 109 is axially slidably supported on non-headed bolts 110a which are threaded into the lower, central die part 103, and it is upwardly urged by compression springs 111 provided between the die part 103 and the holder 109. Another set of non-headed bolts 110a are threaded into the separate, upper guide part 114 and slidably extend through the holder discs, and the upper guide part 114 is axially upwardly urged by compression springs 111 provided between the guide part 114 and the lower holder disc. The guide parts 114 and 112 are formed with holes 116 and 117 respectively therein to permit axial movement of the bolts 110a. Additional bolts 120 fasten the two holder discs together.

Figure 12:
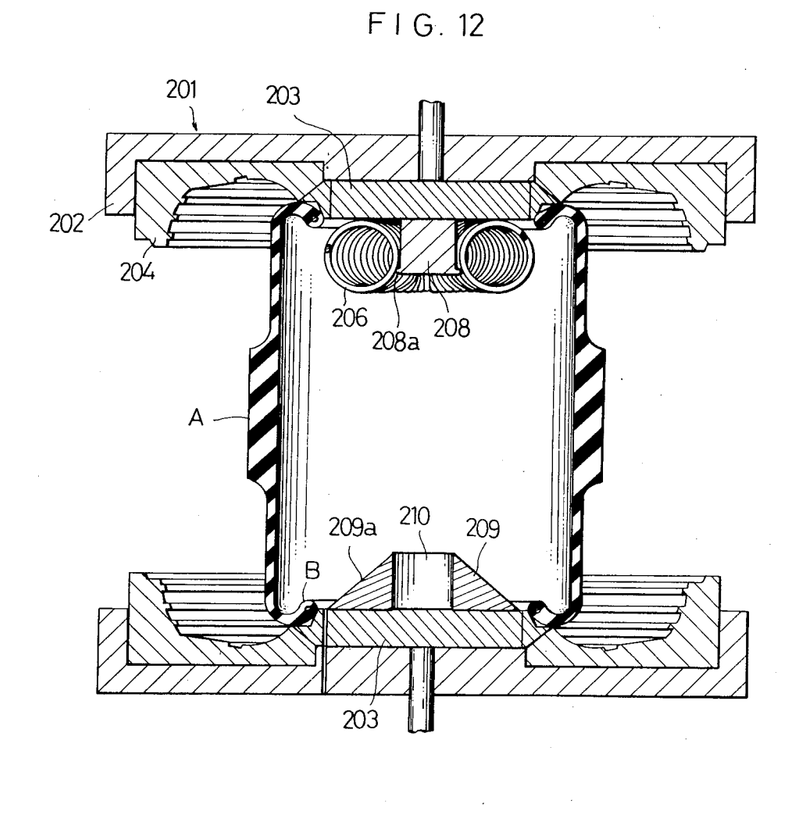
FIGS. 12 and 14 are views generally similar to FIGS. 5 and 6 but showing a fifth embodiment of the invention.
Figure 13:
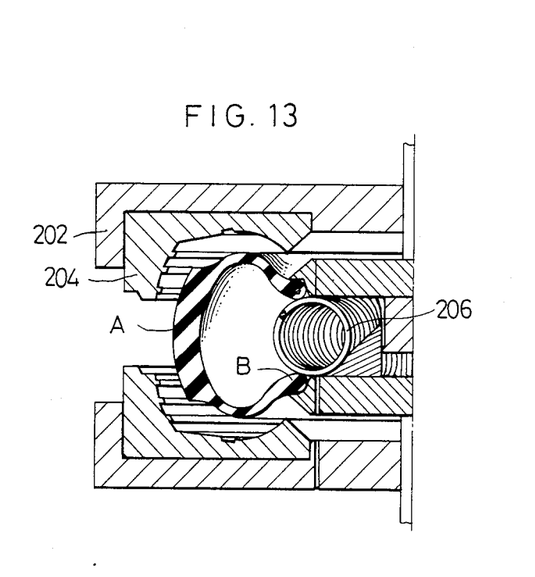
FIG. 13 is a view similar to FIG. 14 but showing the fifth embodiment in a partially closed or open position.
Figure 14:
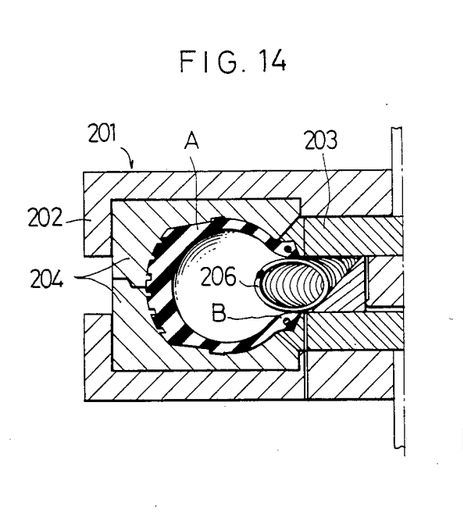

FIGS. 12-14 show the fifth embodiment of the invention. A pair of generally circular split dies 201 each include a base plate 202, a bead plate 203 and a tread die 204, these parts being arranged and relatively movable substantially in the same manner as their counterparts in the embodiment shown in FIGS. 5 and 6. The upper bead plate 203 has a centrally located holder 208 in the form of an axially inwardly projecting circular column, the holder 208 having an end flange 208a at its axially inner end.

An endless tension coiled spring or expandable annulus 206, which can change its diameter, is normally held around the column 208 by its inherent tension. The spring 206 is normally between the flange 208a and the plate 203, and its outer periphery is located slightly inwardly from the inner diameter of the tire A(FIG. 12). The diameter in cross section of the spring 206 is somewhat larger than the distance between the bead plates 203 when they are closest together (FIG. 14).

The lower bead plate 203 has a conical guide part 209 having an axially inwardly projecting center. The part 209 has a radially inwardly and upwardly converging conical surface 209a and a central cylindrical hole 210 which receives the upper column 208.

In operation, referring to FIG. 13, after a tire A has been placed between the dies, the bead plates 203 are moved toward each other, thereby forcing the spring 206 to slide down the conical surface 209a of part 209 thus expanding its diameter toward and between the tire beads B. When the spring 206 reaches and overlies the tire beads B, it engages both bead plates 203 as shown in FIGS. 13 and 14.

Referring to FIG. 14, when the base plates 202 with the tread dies 204 are closed, they force the bead plates 203 close together and press and deform the spring 206 to an oval shape in cross section. The deformed spring overlies the beads and the retaining strength of the deformed spring 206 compresses the tire beads B tightly against the peripheries of bead plates 203.

Figure 15A:
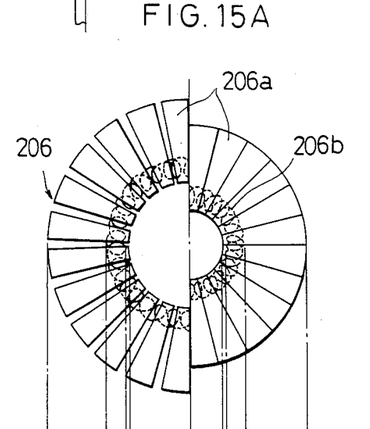
FIGS. 15A and 15B are plan and sectional views of a modification of parts of the fifth embodiment.
Figure 15B:
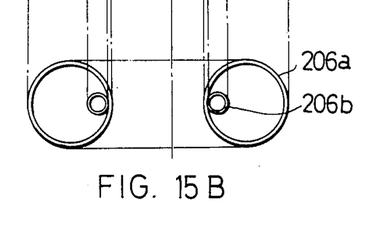

FIGS. 15A and 15B show a modification of annular member 206 in two conditions, an expanded condition shown in the left half of each figure and a contracted condition shown in the right half. The member 206 has the form of a series of rings 206a shaped to constitute a large hollow annulus when they are held together by an endless tension spring 206b that extends through the rings 206a.

Figure 16:
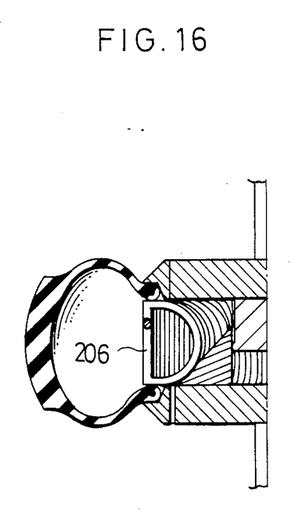
FIGS. 16 and 17 are fragmentary views in axial section showing further modifications of a part of the fifth embodiment.

FIG. 16 shows another form of annular coiled spring member 206, which has a D-shape in cross section, its round side being on the radially inner periphery.

Figure 17:
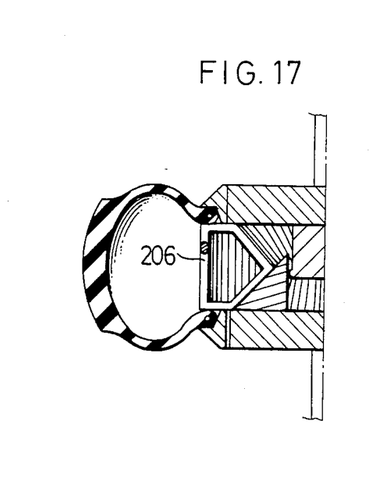

FIG. 17 shows a further form of annular coiled spring member 206, which is shaped to be pentagonal in cross section like a baseball home plate, its angular sides being on the radially inner periphery.

Figure 18:
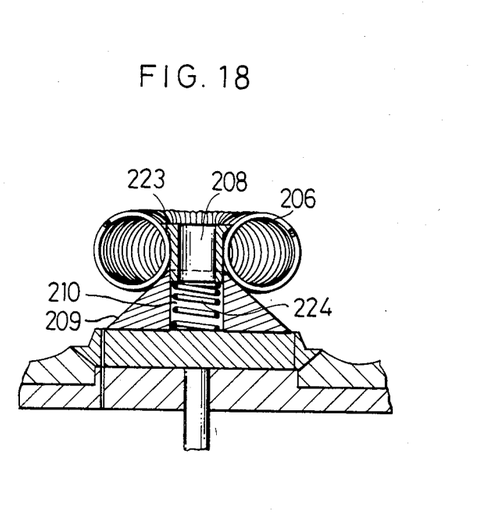
FIG. 18 is a fragmentary side view in axial section of a modification of the fifth embodiment.

FIG. 18 shows a modification of a part of the fifth embodiment shown in FIGS. 12–14. Instead of the guide column 208 shown in FIG. 12, a separate, cylindrical holder 208 is axially slidably supported in the hole 210 of the guide part 209, the holder 208 being upwardly urged by a compression spring 224. The holder 208 is formed with a flange 223 at its top end which normally holds the endless tension spring 206 around the holder.

Figure 19:
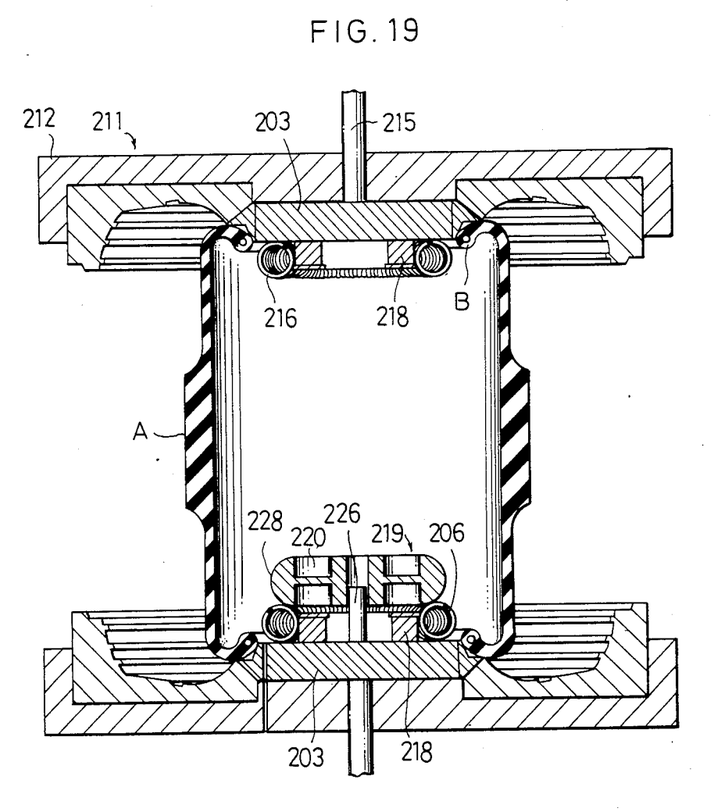
FIGS. 19 and 20 are views similar to FIGS. 5 and 6 but showing a sixth embodiment of the invention.
Figure 20:
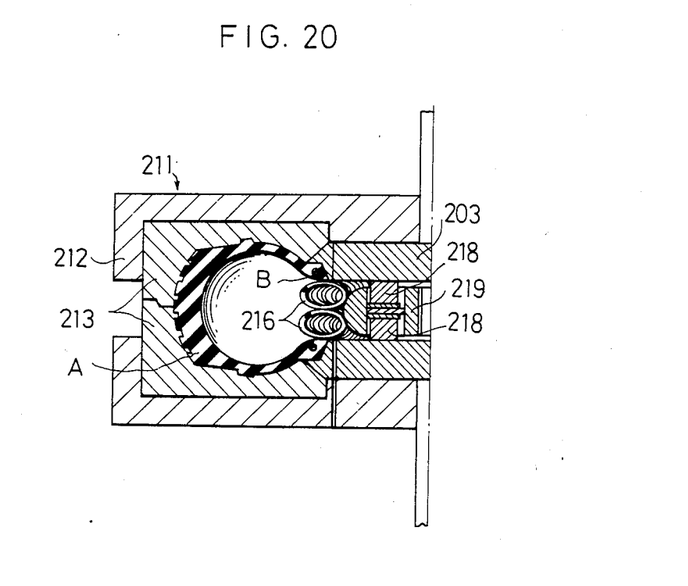
Figure 21:
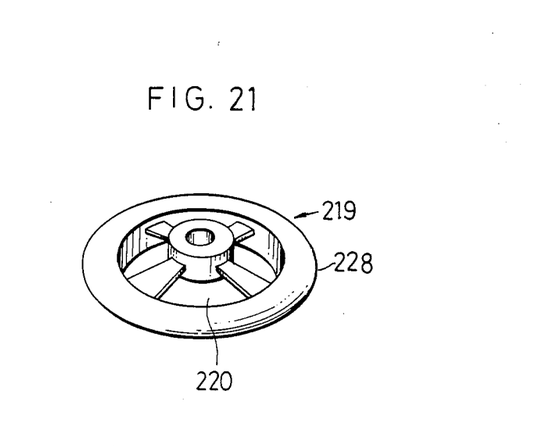
FIG. 21 is a perspective view of a part of the sixth embodiment.

FIGS. 19–21 show the sixth embodiment of the invention. Each bead plate 203 has an annular holder 218 fastened to its axially inner surface, which holds an endless tension spring 216 around it. An annular guide member 219 (FIG. 21) is axially slidably supported on a central pole 226 extending from the lower bead plate 203, which normally sits on the lower spring 216. The guide member 219 has spaces 220 in it for receiving the upper and lower holders 218 when the dies are closed (FIG. 20), and a round outer periphery 228 for sliding engagement with the springs 216. When the die parts are closed as shown in FIG. 20, the springs 216 are radially expanded to and compressed between the tire beads B.

Thus, in accordance with this invention, a tire is quickly heated to vulcanizing temperature by direct engagement of the heating medium with the tire, which has the added advantage of avoiding the need for an internal bladder. The apparatus may include an internal heater for the medium as shown in FIG. 1, or the medium may be heated before flowing into the apparatus. The medium may be a suitable liquid or vapor such as water and air. The foregoing is made possible by the seal formed between the tire beads and the interior surfaces of the dies. Each embodiment of the invention includes holders which are normally in a retracted position where it is spaced radially inwardly from the inner diameter of the tire. The holders are normally in the retracted position when the dies are apart so that a tire may be inserted or removed from the dies. Each embodiment further includes extruding means that automatically responds to closing movement of the dies and moves the holders radially outwardly and into firm engagement with the beads so as to press the beads into sealing engagement with the dies when the dies are closed. The interior of the tire is then pressurized and heated.

What is claimed is:

1. In a machine for vulcanizing a tire by exposing it directly to high-temperature and high-pressure fluid within a circular closed space formed between a pair of upper and lower split dies which are axially movable relative to each other between open and closed positions and are adapted to sandwich the tire therebetween, the improvement of an apparatus for forcing the tire beads tightly against annular inside die surfaces in order to seal said space, said apparatus comprising supporting means provided between said dies, holding means supported by said supporting means for radial movement and including biasing means for urging said holding means to a retracted position where they are radially retracted inwardly away from the inside die surfaces and the tire beads when said dies are open, and extruding means operatively connected to said dies and axially movable therewith relative to said supporting and holding means, said extruding means being responsive to the movements of said dies and engaging said holding means for radially moving said holding means, said extruding means and said holding means including engagable surfaces for moving said holding means radially outwardly in response to axial movement of the dies toward each other, said holding means being radially moved by said extruding means to radial alignment with the tire beads before said dies reach said closed position and then being substantially radially stationary while said dies continue said axial movement to said closed position and said holding means compressively engage the tire beads, whereby when said dies are open, said holding means are radially inwardly retracted away from the tire beads and, as said dies close, said holding means are forced radially outwardly toward the tire beads to hold the beads on the inner surfaces of the dies.

2. Apparatus as in claim 1, wherein said supporting means comprises a pair of spaced discs axially movably supported between said dies, means biasing said discs to a normal spaced position from both of said dies when said dies are open, said holding means comprising a plurality of angularly spaced slide members which are radially slidably supported on said discs, each of said slide members having a sloped portion formed adjacent its inner end, said extruding means comprising an engagement member for engagement with said sloped portions of said slide members.

3. Apparatus as in claim 2, wherein each slide member has an engagement portion supported axially movably adjacent its outer end and outwardly biased for compressive engagement with the tire bead.

4. Apparatus as in claim 3, wherein said engagement portion of alternate slide members are adapted to normally be offset in axial level when said slide members are inwardly retracted.

5. Apparatus as in claim 2, wherein said engagement member is fixed to the inner side of at least one of said dies.

6. Apparatus as in claim 5, wherein said engagement member comprises a coil member.

7. Apparatus as in claim 5, wherein said engagement member or members comprise an inwardly converging conical surface.

8. Apparatus as in claim 1, wherein said holding means comprises a radially expandable annulus biased radially inwardly to normally retract and be supported around said supporting means.

9. In a machine for vulcanizing a tire by exposing it directly to high-temperature and high-pressure fluid within a circular closed space formed between a pair of upper and lower split dies which are axially movable relative to each other between open and closed positions and are adapted to sandwich the tire therebetween, the improvement of an apparatus for forcing the tire beads tightly against the inside die surfaces in order to seal said space, said apparatus comprising supporting means provided between said dies, holding means supported by said supporting means for radial movement and including biasing means for urging said holding means to a retracted position where they are radially retracted inwardly away from the tire beads when said dies are open, and extruding means engagable with said holding means and said dies and axially movable relative to said supporting and holding means, said extruding means being responsive to the movements of said dies for moving said holding means, such that, when said dies are open, said holding means are radially inwardly retracted away from the tire beads and, when said dies close, said holding means are forced outwardly toward the tire beads to hold the beads on the inner surfaces of the dies, said supporting means comprising a pair of spaced discs axially movably supported between said dies, means biasing said discs to a normal spaced position from both of said dies when said dies are open, said holding means comprising a plurality of angularly spaced slide members which are radially slidably supported on said discs, each of said slide members having a sloped portion formed adjacent its inner end, said extruding means comprising an engagement member for engagement with said sloped portions of said slide members, said extruding means further comprising a second engagement member for engagement with said sloped portions of said slide members, said second engagement member being axially slidably supported by and above said supporting discs and upwardly biased.

10. Apparatus as in claim 9, wherein said engagement member or members comprise an inwardly converging conical surface.

11. In a machine for vulcanizing a tire, the machine including a pair of split dies that are movable between open and closed positions and forming a tire receiving space between them, the improvement of apparatus for pressing the tire beads into sealing engagement with interior surfaces of the dies, said apparatus comprising a support adapted to be mounted on at least one of said dies within said space, holding means mounted on said support and radially movable between an expanded position where said holding means is in radial alignment with the tire beads and a retracted position where said holding means is spaced radially inwardly of said beads, and extruding means engagable with said holding means and responsive to movement of said dies to said closed position for moving said holding means from said retracted position to said expanded position before said dies reach said closed position, said holding means being substantially radially stationary as said dies continue movement to the closed position and said holding means compressively engage the tire beads.

12. Apparatus as in claim 11, wherein said holding means comprises a plurality of angularly spaced members, and spring means for urging said members toward said retracted position.

13. Apparatus as in claim 11, wherein said holding means comprises an annular spring member which is radially expandable.

14. Apparatus as in claim 11, wherein said extruding mean is fastened to at least one of said dies.

15. Apparatus as in claim 11, wherein at least a portion of said extruding means is mounted within said space between said dies.

16. In a machine for vulcanizing a tire, the machine including a pair of split dies that are movable between open and closed positions and forming a tire receiving space between them, the improvement of apparatus for pressing the tire beads into sealing engagement with interior surfaces of the dies, said apparatus comprising a support adapted to be mounted on at least one of said dies within said space, an annular coiled spring member mounted on said support and movable between an expanded position where said coiled spring member is in engagement with the tire beads and a retracted position where said coiled spring member is spaced radially inwardly of said beads, and extruding means engagable with said coiled spring member and responsive to movement of said dies for moving said coiled spring member between said expanded and retracted positions.

* * * * *